INVENTOR
T. J. GRENIER
BY Charles Scott Phelan
ATTORNEY

Oct. 30, 1962 T. J. GRENIER 3,061,797

SHIFTING REFERENCE TRANSISTOR OSCILLATOR

Filed Nov. 7, 1957 3 Sheets-Sheet 2

INVENTOR
T. J. GRENIER
BY Charles Scott Phelan
ATTORNEY

Oct. 30, 1962 T. J. GRENIER 3,061,797

SHIFTING REFERENCE TRANSISTOR OSCILLATOR

Filed Nov. 7, 1957 3 Sheets-Sheet 3

INVENTOR
T. J. GRENIER
BY Charles Scott Phelan

ATTORNEY 3,061,797
SHIFTING REFERENCE TRANSISTOR OSCILLATOR

Thomas J. Grenier, Parsippany, N.J., assignor to Bell Telephone Laboratories, Incorporated, New York, N.Y., a corporation of New York Filed Nov. 7, 1957, Ser. No. 695,126
16 Claims. (Cl. 331—114)

This invention relates to oscillatory systems, and more specifically to oscillatory systems wherein plural semiconductor devices are employed for connecting a reference potential terminal to a resonant circuit in different respects for generating sustained oscillations therein.

In certain time-division multiplex transmission systems it is necessary to transmit over one channel interleaved signal spurts from two different signal sources with an identification signal transmitted between signal spurts to associate each spurt with its particular signal source. In one such system, diode switches have been employed for connecting the respective signal sources to the transmission channel. However, it is difficult to control such switches in a manner which will permit the transmission of alternate signal spurts from the separate sources with intermediate spaces between spurts for the transmission of the identification signals. Circuitry available heretofore for this purpose was found to be complicated and usually to require the transmission of a substantial band of frequencies in order that sharp rectangular pulses could be provided for accurate control of the diode switches.

The present invention contemplates an oscillatory circuit including semiconductors for simultaneously generating sine waves and truncated sine waves to control the switching in a multiplex signaling transmission system. A sine wave and a truncated sine wave both include a relatively narrow frequency band, but they may be used in the present invention to control the generation of an identification signal and thereafter to provide time guard spaces for enabling an interleaving of the identification signal with the multiplex signals.

It is therefore one object of the present invention to provide an improved and simplified circuit for generating electric wave oscillations.

Another object is to generate oscillation waves suitable for controlling the switching in a multiplex transmission system.

A further object is to generate in the same oscillatory circuit both sine waves and truncated sine waves.

It is another object to generate in the same oscillatory circuit truncated sine waves for controlling the switching in a multiplex transmission system and other sine waves for controlling the generation of an identification signal for use in such system.

It is another object to generate oscillation waves suitable for the accurate control of the switching in a multiplex signaling system and having relatively narrow frequency transmission requirements.

It is still another object to enable an interleaving of an identification signal with the multiplex signals in a multiplex signaling transmission system.

It is also another object to control the switching in a multiplex signaling transmission system to provide time guard spaces during which only identification signals are transmitted.

These and other objects of this invention are achieved by supplying operating energy to a resonant circuit from a potential source by means of semiconductor switching devices, actuated at least in part in response to the oscillations of the resonant circuit, for alternately connecting the resonant circuit in different respects to a reference potential terminal associated with the potential source.

In an illustrative embodiment of the invention, a pair of junction transistors are connected in a tuned-base, tuned-collector, common emitter, oscillatory circuit. The base and collector tuned, or resonant, circuits are inductively coupled together, and a load resistance with a grounded center tap is connected in parallel with the base tuned circuit. The transistor emitter electrodes are connected together; and the common connection therebetween, considered to be the reference potential terminal, is connected to ground by means of a resistor and an alternating current by-pass capacitor connected in parallel with the resistor. The resistance of the resistor determines the duration of the no-signal interval, or guard space, between signal pulses in a multiplex system controlled by the oscillator.

A source of operating direct-current potential is connected between ground and an intermediate point on the inductance of the collector tuned circuit. There is no connection to an intermediate point on the inductance of the based tuned circuit. The collector electrodes of the respective transistors are connected to opposite terminals of the collector tuned circuit. The two terminals of the base tuned circuit are connected to the base electrodes of the two transistors, respectively, and to a pair of output terminals for the oscillatory circuit.

When power is applied from the source of operating potential, one transistor tends to conduct more than the other and oscillations are initiated in the two resonant circuits. Oscillations in the base resonant circuit drive the two transistors contraphasally in alternate conduction and nonconduction. The conducting transistor connects the reference potential point to a corresponding terminal of the collector tuned circuit via the collector-emitter circuit thereof and to a corresponding terminal of the base tuned circuit via the base-emitter circuit of the transistor. Since the switching of conduction between the two transistors shifts the connection of the reference potential point back and forth between the opposite terminals of the respective resonant circuits, the oscillator is called a "shifting reference oscillator."

The output circuit of the shifting reference oscillator comprises a pair of load resistors connected in series between the output terminals thereof and a connection from the intermediate terminal between the two load resistors to the reference potential terminal. The last-mentioned connection may also include the guard space controlling resistor and by-pass capacitor hereinbefore mentioned. Since the two output terminals are connected to the terminals of the base tuned circuit, a full sine wave output is available therebetween. In addition, a clipped, or truncated, sine wave is available between the above-mentioned intermediate terminal between the load resistors and either of the two output terminals. The respective clipped waves at the two output terminals are of opposite phase with respect to one another and have, in the case of n-p-n transistors, positive-going truncated portions of greater time-duration than the negative-going portions thereof. Each clipped sine wave represents the potential appearing across one load resistor; and it has a sine wave configuration when one ransistor is Off, with the other transistor On, and a truncated sine wave configuration with a small positive potential when the one transistor is On, with the other transistor Off, since the conducting transistor base-emitter circuit effectively short-circuits the one load resistor.

In other illustrative embodiments of the invention the two transistors are arranged in various common-base and common-collector circuits for achieving oscillation by shifting the connection of a reference potential terminal.

It is one feature of the invention that the lack of a ground return connection to an intermediate point of the base tuned circuit in the common emitter circuit lends substantial stability to the circuit so that the output frequency is primarily dependent upon the tuned circuits and not upon the semiconductor devices per se.

It is another feature that the two clipped sine waves may include portions of one polarity which overlap in an adjustable amount in respect to time of occurrence whereby diode switches in a time-division multiplex system may be readily controlled to provide guard spaces, i.e., intervals of no multiplex signal-spurt transmission, for the purpose of enabling the transmission of an identification signal.

Additional objects and features of the invention will be apparent from a consideration of the following specification including the drawing in which.

Figure 1:
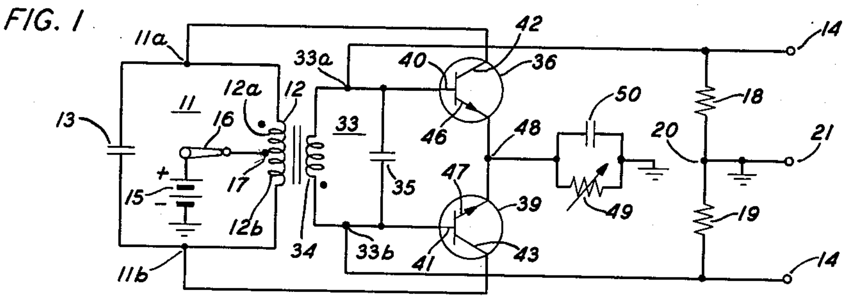
FIG. 1 is a schematic diagram of an oscillator circuit in accordance with one embodiment of the invention.

Referring now to the oscillator circuit of FIG. 1, an inductance 12 connected between terminals 11*a* and 11*b* is divided into two portions 12*a* and 12*b* which are connected together at a terminal 17. A source 15 of direct potential has its positive terminal connected via a switch 16 to terminal 17 and its negative terminal connected to ground. Capacitor 13 is connected to inductance 12 and forms therewith a parallel resonant circuit 11 interposed between terminals 11*a* and 11*b*. This capacitor, however, is not essential to the operation of FIG. 1 as it will presently appear.

A second parallel resonant circuit 33 includes inductance 34 and capacitor 35 connected between terminals 33*a* and 33*b*. The inductance 34 is inductively coupled to both inductance portions 12*a* and 12*b* and is so wound with respect to inductance 12 that when the potential at the upper portion of inductance 12, i.e., terminal 11*a*, is going positively, the potential at the lower portion of inductance 34, i.e., terminal 33*b*, is also going positively, as indicated by the dots adjacent the opposite end portions of the respective inductances. The above-noted winding arrangement of the inductances provides regenerative feedback causing the circuit of FIG. 1 to oscillate as will be hereinafter described.

Junction transistors 36 and 39 perform switching functions in the circuit of FIG. 1 in a manner that will now be explained. The schematic representations of transistors 36 and 39 indicate n-p-n transistors which, as is now well known in the art, comprise two outer layers of n-type semiconductor material and an intermediate portion of p-type semiconductor material, as disclosed in the patent of W. Shockley, No. 2,569,347, issued September 25, 1951. The different portions of semiconductor material form semiconducting junctions at the contacting surfaces thereof. Each transistor is provided with three electrodes, each of which corresponds in function to a corresponding electrode of the other transistor. Thus, base electrodes 40 and 41 are connected to the intermediate p-type portions of transistors 36 and 39, respectively. Collector electrodes 42 and 43 are connected to one of the n-type portions of each of transistors 36 and 39, and emitter electrodes 46 and 47 are connected to the remaining n-type portions of the transistors 36 and 39.

The base-emitter junction of a junction transistor functions as a rectifier in that it conducts current in the forward direction when forwardly biased but does not conduct substantial current when it is reversely biased. When the base-emitter junction is forwardly biased and the base-collector junction is reversely biased, the transistor also acts as an amplifier, producing at the base-collector junction an amplified version of signals applied across the base-emitter junction. However, when the base electrode current is sufficient to forward bias the base-emitter junction to the point where further increase in base-current produces no further increase in collector electrode current, the transistor is said to be in saturated conduction, and the collector current does not display any significant additional amplification beyond the saturation conduction level in response to additional changes in the base-emitter signal as long as this conduction condition prevails.

Collector electrodes 42 and 43 are connected to terminals 11*a* and 11*b*, respectively, of resonant circuit 11. Base electrodes 40 and 41 are connected to terminals 33*a* and 33*b*, respectively, of resonant circuit 33. Oscillator output terminals 14, 14 are also connected to the terminals 33*a* and 33*b*. Emitter electrodes 46 and 47 are connected directly to a common terminal 48 which is considered to be the reference potential terminal. Terminal 48 is connected to ground via an impedance network comprising an adjustable resistor 49 and an alternating current by-pass capacitor 50 connected in parallel. The capacitance of capacitor 50 is of such order of magnitude that it presents negligible impedance to alternating currents at the oscillator frequency. The resistance magnitude of resistance 49 is chosen to provide a guard space of the desired time duration in a manner that will be hereinafter described.

The windings of inductances 12 and 34 may be so proportioned that after either one of the transistors 36 and 39 starts to conduct the instantaneous voltage from its collector electrode to ground drops to a value which is less than that of the instantaneous voltage from its base electrode to ground. Thus, the transistors 36 and 39 are driven into saturated conduction whenever either of them is biased On by oscillations in resonant circuit 33.

A direct current path from base electrode 40 to the associated emitted electrode 46 of transistor 36 includes terminal 33*a*, load resistor 18, terminal 20, ground, variable resistor 49, and reference potential terminal 48. Similarly, a direct current base-emitter circuit for transistor 39 includes terminal 33*b*, load resistor 19, terminal 20, ground, variable resistor 49, and reference potential terminal 48. The external direct current circuits between the collector and emitter electrodes of transistors 36 and 39 include the terminals 11*a* and 11*b*, respectively, the respective inductance portions 12*a* and 12*b*, switch 16 in its closed position, battery 15, ground, variable resistor 49, and terminal 48. Accordingly, amplified oscillation currents in collector electrodes 42 and 43 are fed back via inductance portions 12*a* and 12*b* of resonant circuit 11 to drive resonant circuit 11 for overcoming circuit losses.

Considering now the operation of the circuit of FIG. 1, upon the application of operating energy from source 15 to resonant circuit 11 via switch 16, one of the transistors 36 and 39 tends to conduct slightly more than the other and the regenerative coupling between the base and collector resonant circuits 33 and 11 supports this tendency, thereby driving the one transistor into saturated conduction and biasing the other transistor Off.

Assuming that the one conducting transistor is transistor 36, the oscillation potential in the base resonant circuit 33 causes terminal 33*a* to be positive with respect to terminal 33*b* so that transistor 39 is biased Off while transistor 36 is biased On in saturated conduction.

The potential between terminals 33*a* and 33*b* is also applied to load resistors 18 and 19 and output terminals 14, 14. This potential is represented by the sine wave illustrated in FIG. 2C. Because transistor 36 is conducting, its internal base-emitter resistance is very low and that low resistance together with the low impedance of capacitor 50 shunted by the resistance of variable resistor 49, is much smaller in value than the resistance value of resistor 18. Therefore, terminal 33*a* is effectively clamped by transistor 36 to the positive direct voltage of reference terminal 48 which is only slightly greater than ground potential. This small positive voltage is due to the average total emitter current from both transistor 36 and transistor 39 flowing in resistor 49. The potential of reference terminal 48 constitutes the emitter bias voltage for transistors 36 and 39.

Since the alternating current resistance of the path from terminal 33a through base electrode 40, emitter electrode 46, and capacitor 50 is low for alternating current, load resistor 18 is effectively short-circuited thereby and substantially all of the sinusoidal voltage variation between terminals 33a and 33b appears across load resistor 19. The form of the voltage wave across load resistor 18 is illustrated in FIG. 2A.

When the oscillation potential in resonant circuit 11 reverses in polarity, the induced voltage in the base resonant circuit 33 is reversed in a similar manner thereby tending to bias transistor 39 On and bias transistor 36 Off. The regenerative coupling between resonant circuits 11 and 33 causes conduction to be transferred almost instantaneously from transistor 36 to transistor 39. When transistor 39 is conducting, the terminal 33b is clamped at the potential of reference terminal 48, and transistor 39 effectively short-circuits load resistor 19 thereby causing substantially all of the sinusoidal voltage variation between terminals 33a and 33b to appear across load resistor 18. As the oscillations in base resonant circuit 33 continue, transistors 36 and 39 are driven contraphasally into alternate conduction and non-conduction thereby shifting the connection of the reference potential terminal 48 back and forth between terminals 33a and 33b and between the two output terminals 14, 14. The waveforms of the voltages appearing across load resistors 18 and 19 are shown in FIGS. 2A and 2B, respectively, and are provided in a manner that will be subsequently explained.

Figure 2:
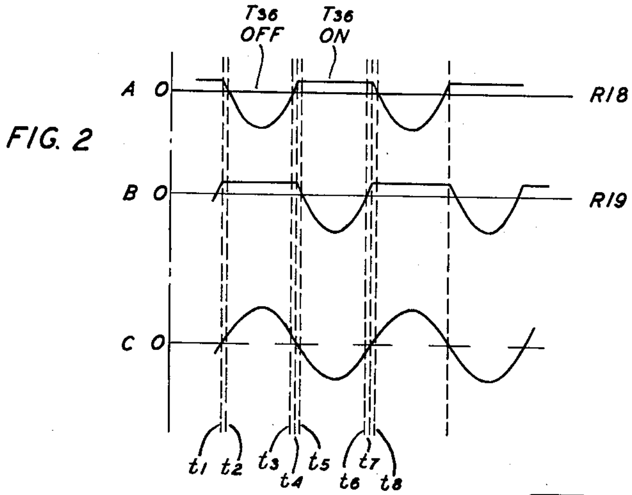
FIG. 2 is a family of waveforms of the oscillatory output waves achieved in the circuit of FIG. 1.

Referring to FIG. 2, the voltage between output terminals 14, 14 is a sine wave as illustrated in FIG. 2C. The voltages across load resistors 18 and 19 shown in FIGS. 2A and 2B individually comprise sine waves with the positive half cycles thereof limited to the small positive reference voltage with respect to ground which corresponds to the positive potential of reference terminal 48. It will be recognized by those skilled in the art that truncated sine waves such as those illustrated in FIGS. 2A and 2B include a substantially narrower band of constituent frequencies than rectangular waves of the same frequency. The magnitude of the reference voltage at terminal 48 may be increased or decreased by varying the value of resistor 49 and thereby changing the average values of the voltage waves illustrated in FIGS. 2A and 2B. For example, if the resistance of resistor 49 is increased, the waveforms illustrated in FIGS. 2A and 2B are moved upwardly with respect to the zero voltage axis illustrated; and the average values of these voltages are increased in the positive direction. In addition, when the waveforms of FIGS. 2A and 2B are moved upwardly, the ratio of the duration of the positive-going truncated portion thereof to the duration of the negative-going sinusoidal portion thereof is also increased.

It will be observed in FIGS. 2A and 2B that the truncated half cycles of the sine waves are substantially flat. This is caused by the low impedance path to ground through the one conducting transistor and capacitor 50 in relation to the impedances of the individual load resistors 18 and 19 as hereinbefore traced and as will now be explained. Assuming that transistor 39 is biased On and transistor 36 biased Off at time $t_1$ in FIG. 2, the voltage waveform of FIG. 2B will appear across load resistor 19; the voltage waveform of FIG. 2A will appear across load resistor 18; and the voltage of the oscillation in resonant circuit 33 will be passing through zero going in the positive direction as shown in FIG. 2C. At time $t_4$, the voltage oscillation in resonant circuit 33 passes through zero going in the negative direction and conduction is transferred from transistor 39 to transistor 36. At time $t_7$ the voltage oscillation in resonant circuit 33 passes through zero going in a positive direction and conduction is transferred from transistor 36 back to transistor 39. In the intervals between time $t_1$ and time $t_2$, time $t_3$ and time $t_5$, and time $t_6$ and time $t_8$, the potentials appearing across both load resistors 18 and 19 are positive with respect to ground, and these potentials are useful for controlling diode switches in a multiplex signaling transmission system to provide time guard spaces between the multiplexed signals in a manner that will be presently described. It will be observed in FIGS. 2A and 2B that the limits of the guard spaces are defined by the zero crossings of the voltage waves of FIGS. 2A and 2B, and the times of occurrence of the zero crossings may be readily determined regardless of the configuration of the waveform.

Figure 3:
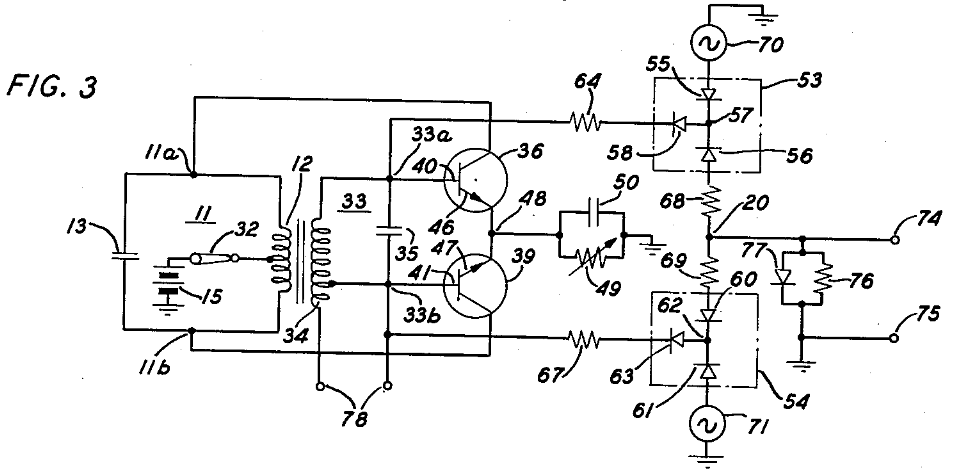
FIG. 3 is a schematic diagram of another embodiment of the invention which includes the circuit of FIG. 1 arranged to control switching in a time-division multiplex transmission system.

Referring now to FIG. 3, there is illustrated a modification of the circuit of FIG. 1 as used with the diode switches of a time-division multiplex transmission system. The circuit of FIG. 3 is essentially the same as that of FIG. 1 and corresponding circuit elements are designated by the same reference characters.

Load resistors 18 and 19 of FIG. 1 have been replaced by a different output circuit in FIG. 3 to accommodate diode switches 53 and 54. Switch 53 comprises diodes 55 and 56 poled for conduction toward common connection point 57, and switch 53 further comprises a diode 58 which is poled for conduction away from the common point 57. Switch 54 includes the diodes 60, 61, and 63 connected to a common point 62 in the same manner as the corresponding diodes of switch 53. A current limiting resistor 64 is connected in series with diode 58 between terminal 33a and common point 57. A current limiting resistor 67 is connected in series with diode 63 between terminal 33b and common point 62. Resistors 68 and 69 are connected in series with diodes 56 and 60, respectively, between common terminal 20 and the common points 57 and 62, respectively.

A first signal source 70 of alternating current is connected in series with diode 55 between ground and common point 57. A second signal source 71 of alternating current is connected in series with diode 61 between ground and common point 62. The time-division multiplex system output is derived between terminal 20 and ground and appears at output terminals 74 and 75 of which terminal 74 is connected to terminal 20 and terminal 75 to ground. Load resistor 76 and limiting diode 77 are connected in parallel between output terminals 74 and 75. A sine wave output is derived from a portion of inductance 34 outside of resonant circuit 33 and appears at terminals 78, 78. This output may be used to drive a signal generator, not shown, to produce the identification signal which may be interleaved with the transmitted signal spurts from signal sources 70 and 71 at output terminals 74 and 75 in a manner that will be hereinafter specified.

The operation of diode switches 53 and 54 is well known in the art. Briefly, in regard to switch 53, for example, when diode 58 is biased Off, diodes 55 and 56 are likewise biased Off; and no signal is transmitted from source 70 to the system output terminals 74 and 75. However, when diode 58 is biased On, diodes 55 and 56 are also biased On and signals are transmitted therethrough from source 70 to output terminals 74 and 75. A similar operation obtains in switch 54.

Turning now to the operation of FIG. 3 in connection with the waveform voltages shown in FIG. 2 (FIGS. 2A, 2B, and 2C), it will be understood that the operation of the oscillator portion of FIG. 3 is essentially the same as that described above in connection with the corresponding oscillator position in FIG. 1 for producing the output waves illustrated in FIG. 2. When transistor 36 is Off and its base electrode is negatively biased, from time $t_2$ to time $t_3$, as shown in FIG. 2A, the diodes of switch 53 are On, switch 53 is closed, and signals are transmitted from source 70 via the forward resistances of diodes 55 and 56, resistor 68, terminal 20, and resistor 76 to ground. Part of the signal energy also passes to ground via a path which is parallel to part of the last-mentioned path and which includes diode 58, current limiting resistor 64, terminal 33*a*, resonant circuit 33, base electrode 41, emitter electrode 47, reference potential terminal 48, and alternating current by-pass capacitor 50 to ground. When transistor 36 is Off and its base electrode is positively biased, during the time intervals $t_1$ to $t_2$, $t_3$ to $t_4$, $t_7$ to $t_8$, as shown in FIG. 2A, the diodes of switch 53 are biased Off, switch 53 is open and no signal is transmitted from source 70 to output terminals 74 and 75. Likewise, when transistor 36 is On with its base electrode 40 positively biased, as for example during the interval between time $t_4$ and time $t_7$, as shown in FIG. 2A, the diodes of switch 53 are biased Off, switch 53 is open and there is no signal transfer from source 70 to output terminals 74 and 75.

Similarly, in the case of transistor 39, its corresponding diode switch 54 is closed when transistor 39 is Off with a negative base potential, and switch 54 is open when transistor 39 is Off with a positive base potential as well as when transistor 39 is On with a positive base potential.

Thus, when the base electrodes of both transistor 36 and transistor 39 are positive with respect to ground at the same time, both diode switch circuits are open and no multiplex signal from either source 70 or source 71 reaches output terminals 74 and 75. This constitutes a guard space interval and is defined, in terms of FIGS. 2A, 2B, and 2C, as the interval between times $t_3$ and $t_5$ or between times $t_6$ and $t_8$. It is during these time intervals of no multiplex signal at terminals 74 and 75 that the identification signal generator connected to terminals 78, 78 is operated to apply identification signals to terminals 74 and 75 thereby interleaving those signals with the multiplex signals appearing thereat. It will be appreciated, of course, that for proper operation of the diode switches connected as in FIG. 3, the oscillator truncated output waves must have positive and negative portions with respect to ground so that the switches can be biased On and Off. If the truncated waves are entirely above ground or entirely below ground, as in some embodiments to be hereinafter described, the diode switches would remain Off or On at all times even though the oscillator continues to operate in its shifting reference mode as hereinbefore described.

Referring to the waveforms shown in FIG. 2, it is seen that the transfer of conduction between transistors 36 and 39 of the oscillator circuits occurs at the time of polarity reversal of voltages at the terminals of the respective resonant circuits 11 and 33 in FIG. 3. Therefore, such conduction transfer is primarily under the control of the resonant circuit impedances and is not significantly affected by the transistor characteristics per se.

Diode switches 53 and 54 are alternately closed for the transmission of multiplex signals therethrough only when the following two conditions are fulfilled at the same time: (1) the potential of the terminal of resonant circuit 33 connected to the corresponding diode switch is negative with respect to ground, and (2) the transistor which is connected to the opposite terminal of resonant circuit 33 is On to provide therethrough a ground return path which has been previously traced. As mentioned above, the first condition is primarily under the control of the resistance of variable resistor 49. Fulfillment of the second condition is controlled by the resonant circuit impedances. If the resistance of resistor 49 is increased, the transistor base electrode potential required for conduction transfer between the transistors is increased and the duration of the positive portions of the individual truncated output waves is increased. The time overlap of the positive portions of the truncated waves is thereby increased, and resistor 49 may be thus utilized to control the duration of the guard space between multiplex signal pulses transmitted to terminals 74 and 75 from sources 70 and 71.

The shifting reference oscillator principles hereinbefore discussed in connection with the circuits of FIGS. 1 and 3 may also be applied to other transistor circuit configurations of which further illustrative embodiments will now be discussed.

Figure 4:
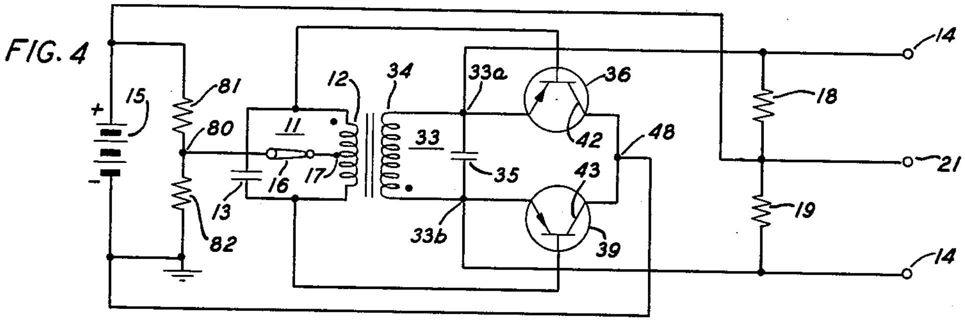
FIGS. 4 through 7 are schematic diagrams of additional embodiments of the invention shown in FIG. 1.

Referring now to FIG. 4, there is illustrated a common collector type of shifting reference oscillator. Since the circuit of FIG. 4 is similar to the circuit of FIG. 1, circuit elements in FIG. 4 corresponding to those discussed above in connection with FIG. 1 are designated by the same reference characters. Transistors 36 and 39 are illustrated as the p-n-p types which are disclosed in the Shockley patent, supra. The connections for applying the operating direct current potential to the oscillator circuit have been changed as hereinafter described from those illustrated in FIG. 1 in order to accommodate the arrangement of connecting transistor electrodes in the common collector type. Otherwise the oscillator circuit of FIG. 4 is similar to that of FIG. 1. Resistors 81 and 82 comprise a potential divider which is connected between the terminals of battery 15. Connection point 80 common to resistors 81 and 82 is connected to terminal 17 in resonant circuit 11 via switch 16. Resistors 81 and 82 are provided to isolate terminal 17 from battery 15. Reference potential terminal 48, common to collector electrodes 42 and 43, is connected to the negative terminal of battery 15. Terminal 21, common to load resistors 18 and 19, is connected to the positive terminal of battery 15. The operation of FIG. 4 is similar to that described above in connection with FIG. 1. The sustained oscillations in resonant circuit 33 drive transistors 36 and 39 contraphasally into alternate conduction and nonconduction. When transistor 36 is conducting in response to oscillation half cycles of one polarity in resonant circuit 33, it completes a series conductive loop from terminal 33*a*, through the emitter-collector circuit of transistor 36, reference terminal 48, source 15, load resistor 19, terminal 33*b*, and inductance 34. When transistor 39 is conducting in response to oscillation half cycles of the opposite polarity, it completes a series loop conductive path from terminal 33*b* through the emitter-collector circuit of transistor 39, reference terminal 48, battery 15, load resistor 18, terminal 33*a* and inductance 34.

The common collector circuit of FIG. 4 provides a full sine wave output between terminals 14, 14 such as that illustrated in FIG. 2C. In addition, a truncated sine wave output may be derived between reference potential terminal 48 and either of output terminals 14, 14. The latter output has waveforms which are similar to the output waveforms illustrated in FIGS. 2A and 2B, but does not include the adjustable time guard spaces since in the circuit configuration of FIG. 4 it is not convenient to control time guard spaces by means of a parallel RC circuit between reference potential terminal 48 and ground as was done with RC network 49 and 50 in the common emitter circuit illustrated in FIG. 1. However, the circuit of FIG. 4 may be further modified, as hereinafter discussed in connection with FIG. 7, to provide adjustable guard spaces. Truncated output waves also appear between terminal 21 and either of the terminals 14 in FIG. 4, but these are entirely positive with respect to ground and so are not suitable for controlling diode switches.

Figure 5:
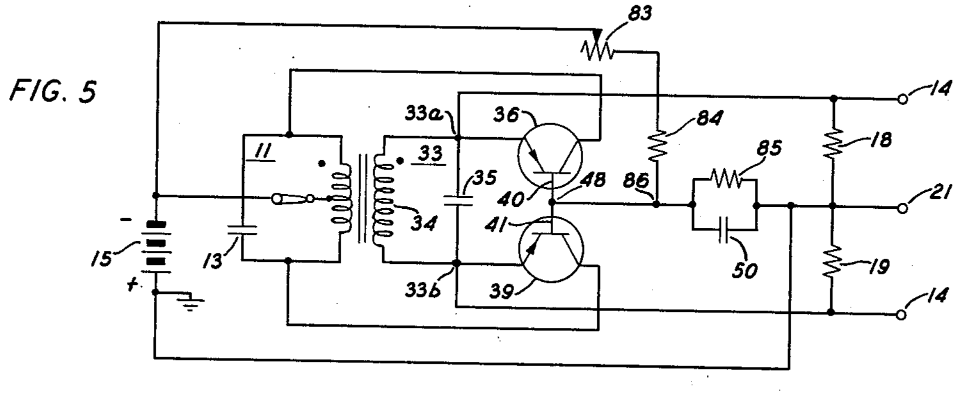

Referring now to FIG. 5, there is illustrated a common base modification of the shifting reference oscillator employing p-n-p transistors. This oscillator is similar to that illustrated in FIG. 1 except the connections for applying operating potential to the oscillator have been modified to accommodate the change in transistor electrode connections in a manner explained below. Rheostat 83 and resistors 84 and 85 are connected in series between the terminals of battery 15 to form a potential divider for establishing a base potential level for transistors 36 and 39. Base electrodes 40 and 41 are both connected to reference potential terminal 48 which is in turn connected directly to a terminal 86 between resistors 84 and 85. By-pass capacitor 50 is connected between terminals 86 and 21; and terminal 21 is connected to the grounded positive terminal of source 15. Resistor 85, which shunts capacitor 50, has a relatively high resistance compared to the resistance of resistor 49 of FIG. 1 to keep the magnitude of direct current in the voltage divider comprising resistors 85 and 84 and rheostat 83 as low as possible.

The operation of the common base circuit illustrated in FIG. 5 is similar to the operation described above in connection with the common emitter circuit of FIG. 1. The oscillations in resonant circuit 33 drive transistors 36 and 39 contraphasally in alternate conduction and nonconduction. When transistor 36 is conducting in response to the oscillation half cycles of one polarity in resonant circuit 33, it completes a series conductive loop circuit for alternating current from terminal **33*a* through the emitter-base circuit of transistor 36, reference terminal 48, terminal 86, capacitor 50, load resistor 19, terminal 33*b*, and resonant circuit 33. Likewise, when transistor 39 is conducting in response to oscillation half cycles of the opposite polarity, it completes a series conductive loop for alternating current from terminal 33*b* through the internal emitter-base circuit of transistor 39, reference terminal 48, terminal 86, capacitor 50, load resistor 18, terminal 33*a* and resonant circuit 33. The common base circuit of FIG. 5 produces a full sine wave between output terminals 14, 14 similar to that illustrated in FIG. 2C and truncated sine waves between terminal 21 and either one of output terminals 14, 14 similar to those illustrated in FIGS. 2A and 2B but with the truncated waves entirely below ground. As mentioned above in connection with FIG. 3, such truncated waves which are all of one polarity are not suitable for controlling diode switches to provide guard spaces. A parallel resistance-capacitance circuit 85, 50 is provided between ground and reference terminal 48 as was done in the common emitter circuit of FIG. 1, but in FIG. 5 the direct potential drop across resistor 85 and the shunting capacitor 50 limit the positive-going potential of terminals 14, 14 to a value which is less positive than the potential at terminal 21**.

Figure 6:
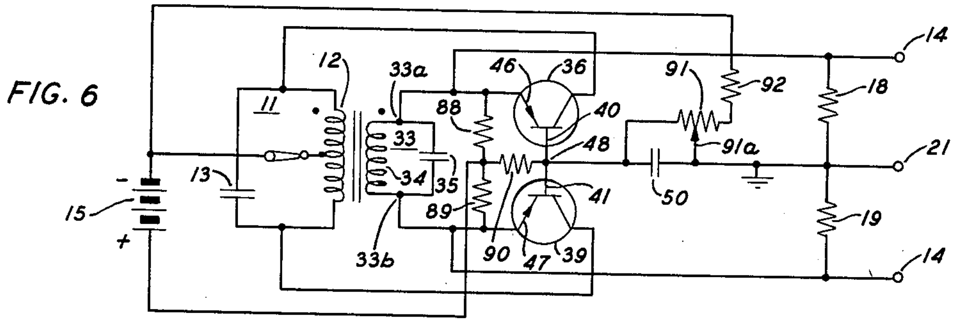

Referring now to FIG. 6, there is illustrated a common base configuration of the shifting reference oscillator which is similar to that illustrated in FIG. 5, but in FIG. 6 the circuit arrangements for providing operating potential have been further modified in a manner explained below so that the truncated sine waves appearing between terminal 21 and either one of the output terminals 14, 14 are suitable for controlling the diode switches in a two channel multiplex system, not shown, to provide time guard spaces between the multiplexed signals in the manner described above in connection with FIGS. 1 and 3.

In the circuit of FIG. 6, which also employs p-n-p transistors, the resistors 88 and 89 connect the positive terminal of battery 15 to emitter electrodes 46 and 47, respectively. A potential divider including series connected resistors 90, 91, and 92 is connected between the terminals of battery 15. Reference terminal 48 which is connected to base electrodes 40 and 41 is also included in the potential divider between resistors 90 and 91, and connected via by-pass capacitor 50 to output terminal 21 which is grounded. An adjustable tap **91*a* on resistor 91** is also connected to ground.

The operation of the circuit in FIG. 6 is substantially the same as the operation of the common base circuit in FIG. 5 except that in FIG. 6 the direct potential difference across resistor 91 is reversed with respect to the potential difference across resistor 85 of FIG. 5. Therefore, terminals 14 can become more positive than terminal 21 to provide guard space control of diode switches. The tap **91*a* may be adjusted along resistor 91 to vary the emitter-base potential at which the transistors begin to conduct with respect to the load return terminal 21** thereby providing adjustable time guard spaces in the truncated output waves as illustrated in FIGS. 2A and 2B and hereinbefore described in connection with the common emitter circuit of FIGS. 1 and 3.

Figure 7:
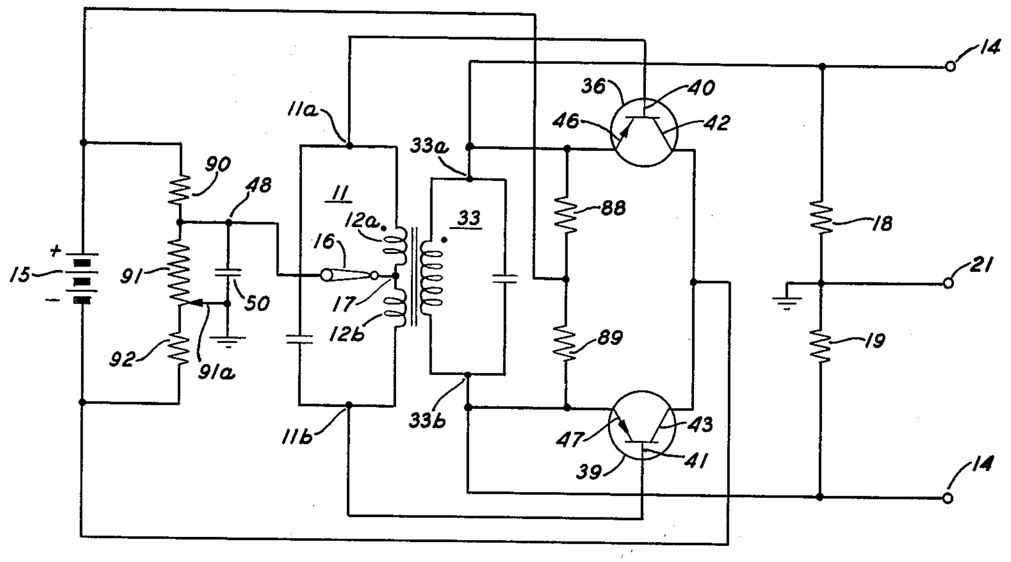

Referring now to FIG. 7 there is illustrated a common collector modification of the shifting reference oscillator described above regarding FIG. 4 and including biasing means for the transistors whereby time guard spaces may be provided in connection with the truncated output waves between terminal 21 and either one of output terminals 14, 14 in a manner similar to that described above in regard to FIGS. 1 and 3. Circuit elements in FIG. 7 corresponding to circuit elements employed in FIG. 4 are designated by the same reference characters. Battery 15 is provided with potential dividing resistors 90, 91, and 92 connected in series between the terminals thereof. The resistances of resistors 91 and 92 are relatively small compared to the total potential divider resistance, each comprising less than twenty percent of the total potential divider resistance. Reference potential terminal 48, which is connected to a common point for resistors 90 and 91, is also connected via switch 16 to the terminal 17 between inductive portions **12*a* and 12*b*. Grounded tap 91*a* is connected to reference potential terminal 48 via by-pass capacitor 50. Resistors 88 and 89 connect emitter electrodes 46 and 47 to the positive terminal of battery 15. These electrodes are also connected to resonant circuit terminals 33*a* and 33*b*, respectively. Base electrodes 40 and 41 are connected to resonant circuit terminals 11*a* and 11*b*, respectively. Collector electrodes 42 43 are connected by a common connection to the negative terminal of battery 15. Output terminal 21 is grounded; output terminals 14, 14 are connected to the respective emitter electrodes; and load resistors 18 and 19 are connected between terminal 21 and the respective terminals 14, 14**.

The operation of the common collector circuit of FIG. 7 produces output waves similar to those illustrated in FIG. 2 and hereinbefore described. However, the operation of the shifting reference oscillator circuit in FIG. 7 is different from the operation of the oscillator circuit shown in FIG. 4 as well as the other oscillator circuits hereinbefore described in a manner that will now be explained. The combined resistance of resistor 92 and either one of load resistors 18 and 19 will generally be substantially larger than the conducting emitter-collector resistance of a junction transistor, the latter usually being smaller than the former by about one order of magnitude, i.e., a factor of ten. When transistor 36 begins to conduct to a greater extent than transistor 39, a current flows from the positive terminal of battery 15 through resistor 88, emitter electrode 46, collector electrode 42 and back to the negative terminal at battery 15. The amount of this current is much larger than that of any current which may be conducted via resistor 89, terminal **33*b*, load resistor 19, ground, and resistor 92. Terminal 33*b* is, therefore, substantially more positive than terminal 33*a***.

Oscillations from resonant circuit 33 which are coupled to resonant circuit 11 drive terminal **11*a* negatively with respect to terminal 11*b* when terminal 33*a* is negative with respect to terminal 33*b*. Base electrode 40 is thus driven negatively. This action at first tends to drive transistor 36 more heavily in conduction as the amplitude of the oscillation in resonant circuit 11 builds up. However, after the amplitude of oscillation has reached a maximum of one polarity and swung toward its maximum amplitude with the opposite polarity, terminal 11*b* becomes more negative than terminal 11*a*. Conduction in transistor 36 is then reduced and conduction in transistor 39 is initiated. As conduction in transistor 39 increases the current drawn from battery 15 through resistor 88 is reduced and a relatively larger current begins to flow in resistor 89. This shift in the amount of current from resistor 88 to resistor 89, in response to the shift in conduction from transistor 36 to transistor 39 caused by the oscillations in resonant circuit 11, changes the polarity of the potential difference across resonant circuit 33 so that terminal 33***a* now becomes more positive than does terminal 33*b*. This potential difference is inductively coupled to resonant circuit 11 thereby regeneratively encouraging the aforementioned conduction shifts from transistor 36 to transistor 39.

When transistor 36 is conducting it completes a conductive loop circuit for alternating current from base electrode 40 through terminal 11*a*, inductive portion 12*a*, terminal 17, switch 16, reference terminal 48, by-pass capacitor 50, ground, load resistor 18, terminal 33*a*, and emitter electrode 46 back to base electrode 40. When transistor 39 is conducting, the connection of reference terminal 48 is shifted to a conductive loop circuit for alternating current from base electrode 41 through terminal 11*b*, inductive portion 12*b*, terminal 17, switch 16, reference potential terminal 48, by-pass capacitor 50, ground, load resistor 19, terminal 33*b*, and emitter electrode 47 back to base electrode 41. Thus, the resonant circuits 11 and 33 cooperate to drive transistors 36 and 39 contraphasally into alternate conduction and nonconduction thereby shifting the conductive connection of reference potential terminal 48 back and forth between base electrodes 40 and 41. The output wave between terminals 14, 14 in FIG. 7 is a full sine wave as shown in FIG. 2C since these terminals are connected across resonant circuit 33. Individual truncated sine waves appear across each of the load resistors 18 and 19 in opposite phase relative to one another and with a guard space of a time duration which is controllable by the adjustment of tap 91*a*.

It will be observed that in the previously described embodiments of the shifting reference oscillator, the truncated portion of the output wave appearing across one load resistor occurred during the time interval when that load resistor was short circuited by the corresponding transistor being On, e.g., when load resistor 18 in FIG. 1 was short circuited by transistor 36 being On. In the modification of FIG. 7, however, the truncated portion of the sine wave appearing across a load resistor occurs during the interval when the corresponding transistor is Off as will be hereinafter discussed. This difference in operation does not alter the shifting reference aspect of the oscillator; it does not have any substantial effect on the output waves that are made available; and it is probably due to the different arrangement of the circuit resistances that are employed to provide the time guard spaces in the truncated output waves.

In FIG. 7, the resistance of load resistor 18 is approximately an order of magnitude smaller than the combined resistance of resistors 88 and 92. Similarly, the resistance of load resistor 19 is approximately an order of magnitude smaller than the combined resistance of resistors 89 and 92. Accordingly, when transistor 36 is conducting in a path including resistor 88 and the emitter-collector path of transistor 36 as described above, there is a parallel conduction path comprising the positive terminal of battery 15, resistor 89, terminal 33*b*, resistor 19, ground, resistor 92, and the negative terminal of battery 15. Since resistor 19 is small compared to resistors 89 and 92 together, terminal 33*b* is almost at ground potential regardless of current variations which may take place in the parallel path. Therefore, the truncated portion of the output wave across resistor 19 occurs when transistor 39 is Off and transistor 36 is On. It can be shown in a similar manner that the truncated portion of the output wave across resistor 18 occurs when transistor 36 is Off and transistor 39 is On.

Although the principles of the invention have been described in connection with particular embodiments, it will be understood that other embodiments will be apparent to those skilled in the art without departing from the spirit and scope of the invention.

What is claimed is:

1. An oscillatory circuit comprising first and second parallel resonant circuits inductively coupled together for the transmission of oscillations therebetween, a reference potential point, a source of direct potential, means for connecting said source between said reference potential point and an intermediate point in said first resonant circuit, a first and a second transistor each having a base electrode, an emitter electrode and a collector electrode, an output circuit connected between said base electrodes, means for connecting said emitter electrodes to said reference potential point, means for connecting said collector electrodes to opposite terminals of said first resonant circuit, means for connecting said base electrodes to opposite terminals of said second resonant circuit for alternately biasing said transistors into saturated conduction in response to oscillations in said second resonant circuit, and said alternately conducting transistors alternately connecting the respective opposite terminals of said first resonant circuit to said reference potential point via the internal collector-emitter circuit of the conducting transistor and alternately connecting the respective opposite terminals of said second resonant circuit to said reference potential point via the internal base-emitter circuit of said conducting transistor.

2. The oscillatory circuit in accordance with claim 1 wherein the means for connecting said emitter electrodes to said reference potential point comprises a direct metallic connection between said emitter electrodes, and said means for connecting said source comprises an impedance connected between said reference potential point and said source.

3. The oscillatory circuit in accordance with claim 2 wherein said impedance comprises a variable resistor connected in series between said reference potential point and one terminal of said source, and an alternating current by-pass capacitor connected in parallel with said variable resistor.

4. The oscillatory circuit in accordance with claim 3 in which said oscillations are sinusoidal in form, said output circuit includes two load resistors of equal resistance connected in a series circuit between said base electrodes, means for connecting an intermediate terminal common to said load resistors to said one terminal of said source, first and second output terminals connected to said base electrodes, respectively, whereby said sinusoidal oscillations in said second resonant circuit appear between said first and said second output terminals and individual sinusoidal oscillation waves of opposite phase and having clipped alternate wave portions of one polarity appear between each of said output terminals and said intermediate terminal, and said variable resistor simultaneously controlling the duration of said alternate wave portions of both of said oscillation waves.

5. The oscillatory circuit in accordance with claim 4 in which the resistance of said variable resistor has a value such that said alternate wave portions of said one polarity are of greater duration than the remaining intermediate portions of opposite polarity whereby both of said clipped oscillation waves include portions of said one polarity which are concurrent in point of time, and said second resonant circuit includes an untapped coil.

6. The oscillatory circuit in accordance with claim 1 in which said output circuit comprises a first pair of resistors each having one terminal thereof connected to the base electrode of one of said transistors, a pair of switching devices each having an input terminal, an output terminal, and a control terminal, a second pair of resistors, means for connecting said second pair of resistors in series between the output terminals of said devices, and output connection at the common junction of said second pair of resistors, a connection from the other terminal of each resistor of said first pair of resistors to a control terminal of a different one of said devices for biasing said devices open and closed for predetermined intervals in response to said oscillations.

7. The oscillatory circuit in accordance with claim 6 in which said means for connecting said emitter electrodes to said reference potential point comprises a direct metallic connection between each of said emitter electrodes and said reference potential point, and said means for connecting said source comprises a variable resistor connected in series between said reference potential point and said source for adjusting the direct current bias on said emitter electrodes, and an alternating current by-pass capacitor connected in parallel with said variable resistor.

8. An oscillator circuit comprising two transistors each having first, second, and third electrodes corresponding to first, second, and third electrodes of the other, first and second parallel resonant circuits inductively coupled together, said second parallel resonant circuit comprising a capacitor and an untapped inductor connected in parallel therewith, means for connecting said first resonant circuit between said first corresponding electrodes, means for connecting an output circuit between said second corresponding electrodes, means for also connecting said second resonant circuit between said second corresponding electrodes for alternately biasing said transistors On and Off in opposite phase, a reference potential terminal, and means including said reference potential terminal for connecting said third corresponding electrodes to an intermediate terminal of said output circuit, the last-mentioned means comprising, in addition, means setting the average values of oscillations produced in parts of said output circuit on each side of said intermediate terminal to have oscillation portions of the same polarity overlapping one another in point of time.

9. An oscillator circuit comprising first and second transistors each having a base electrode, an emitter electrode, and a collector electrode, a parallel resonant circuit including an untapped coil connected between a first pair of like electrodes, an inductor connected between a second pair of like electrodes, means connecting the electrodes of the remaining pair of like electrodes together, an output circuit having first and second portions connected in series between the terminals of said resonant circuit, a resistor, and a capacitor connected in parallel with said resistor between said remaining electrodes and a terminal common to said first and second portions.

10. An oscillator comprising first and second transistors each having a base electrode, an emitter electrode, and a collector electrode, a parallel resonant circuit connected between a first pair of like electrodes, an inductor connected between a second pair of like electrodes, means connecting the electrodes of the remaining pair of like electrodes together, an output circuit having an intermediate tap thereon and being connected between said first pair of like electrodes, a source of operating potential, means connecting said source to said inductor and to said remaining electrodes, and the last-mentioned means including resistance means fixing the average values of oscillations between said tap and either electrode of said first pair of electrodes, and a capacitor connected in parallel with at least a portion of said resistance means and having one terminal thereof connected to said intermediate tap.

11. The oscillator circuit in accordance with claim 10 in which said first, second, and third pairs of electrodes are, respectively, said base, collector, and emitter electrodes.

12. The oscillator circuit in accordance with claim 10 in which said first, second, and third pairs of electrodes are said emitter, base, and collector electrodes, respectively.

13. The oscillator circuit in accordance with claim 12 in which said source of operating potential is connected between said collector and emitter electrodes, said resistance means couple an intermediate potential of said source to said inductor, and means are provided to vary said resistance means portion.

14. The oscillator circuit in accordance with claim 10 in which said first, second, and third pairs of electrodes comprise said emitter, collector, and base electrodes, respectively.

15. The oscillator circuit in accordance with claim 14 in which said resistance means is connected between the terminals of said source of operating potential, and the ends of said portion are connected respectively to said base electrodes and said intermediate tap.

16. The oscillator circuit in accordance with claim 14 in which further resistance means connect one terminal of said source of operating potential to both of said emitter electrodes.

References Cited in the file of this patent

UNITED STATES PATENTS

| | | |
|---|---|---|
| 1,966,046 | Roberts | July 10, 1934 |
| 2,318,061 | Dailey | May 4, 1943 |
| 2,506,158 | Mann et al. | May 2, 1950 |
| 2,578,575 | Montcalm | Dec. 11, 1951 |
| 2,605,360 | Trevor | July 29, 1952 |
| 2,748,274 | Pearlman | May 29, 1956 |
| 2,764,643 | Sulzer | Sept. 25, 1956 |
| 2,772,370 | Bruce et al. | Nov. 27, 1956 |
| 2,774,878 | Jensen | Dec. 18, 1956 |
| 2,871,354 | Pearlman | Jan. 27, 1959 |
| 2,882,402 | Ireland | Apr. 14, 1959 |
| 2,883,539 | Bruck et al. | Apr. 21, 1959 |

FOREIGN PATENTS

| | | |
|---|---|---|
| 782,406 | Great Britain | Sept. 4, 1957 |